United States Patent

[11] 3,584,475

[72] Inventors William F. Galey
Saxonburg;
John E. Sensi, Arnold, both of, Pa.
[21] Appl. No. 810,517
[22] Filed Mar. 26, 1969
[45] Patented June 15, 1971
[73] Assignee PPG Industries, Inc.
Pittsburgh, Pa.
Continuation-in-part of application Ser. No. 680,155, Nov. 2, 1967, now abandoned, which is a continuation-in-part of application Ser. No. 630,914, Apr. 4, 1967, now abandoned, and a continuation-in-part of 787,488, Dec. 27, 1968, now abandoned, which is a division of application Ser. No. 680,153, Nov. 2, 1967, now abandoned, which is a continuation-in-part of application Ser. No. 630,914, Apr. 14, 1967, now abandoned.

[54] FLOAT GLASS TANK WITH A PARTICULATE BOTTOM COVERING
8 Claims, 5 Drawing Figs.
[52] U.S. Cl................................................ 65/24,
65/99 A, 65/169, 65/182 R, 65/374
[51] Int. Cl...................................................... C03b 18/02
[50] Field of Search............................................ 65/182, 99
A, 65 A, 24, 26, 169

[56] References Cited
UNITED STATES PATENTS

| | | | |
|---|---|---|---|
| 2,262,826 | 11/1941 | Willetts | 65/26 |
| 2,323,265 | 6/1943 | Willetts | 65/26 |
| 3,332,763 | 7/1967 | Basler | 65/99 |
| 3,393,061 | 7/1968 | Greenler | 65/99 |
| 3,494,754 | 2/1970 | Montgomery | 65/26 |

Primary Examiner—S. Leon Bashore
Assistant Examiner—J. B. Hardaway
Attorney—Chisholm and Spencer ABSTRACT: A granular or powdered material such as carbon or graphite, is poured or placed on the bottom of a float bath tank constructed of refractory blocks and the tank is filled with a liquid of a density greater than glass, such as molten tin, which liquid supports glass during the manufacture of float glass. The granules or particles which have a density less than that of the molten tin, prevent sticking of hot glass to the bottom blocks of the tank when occasional glass-to-bottom contact is made. The sides of the tank may also be so covered with the material as to eliminate adherence of the ribbon thereto. In lieu of carbon or graphite, other particulate materials may be used, such as silicon carbide, silica, alumina, boron nitride, titanium nitride, titania, zirconia, zirconium silicate, clay refractories and various mixtures of such materials with or without carbon or graphite.

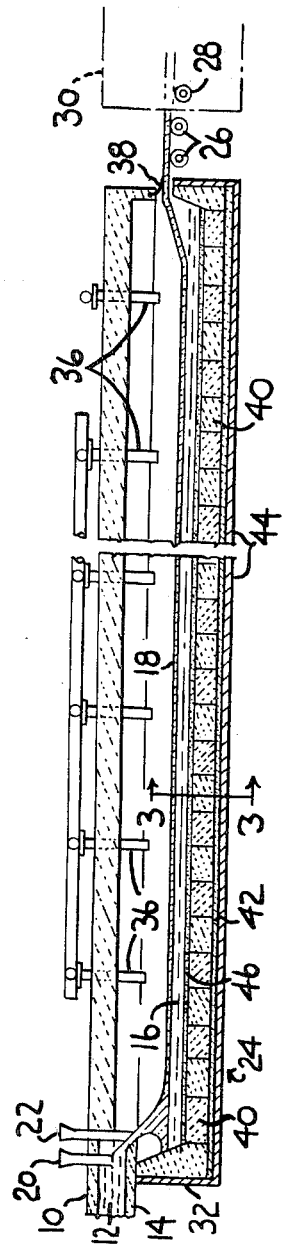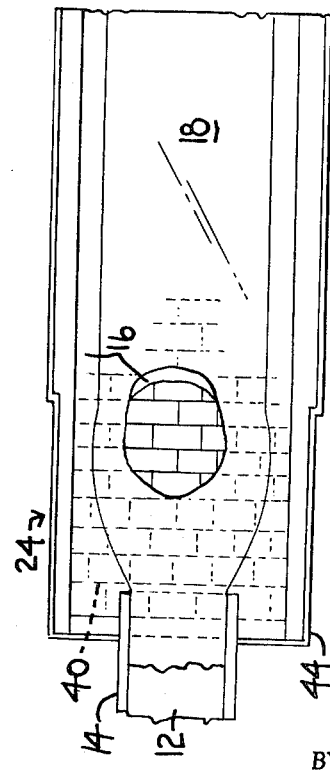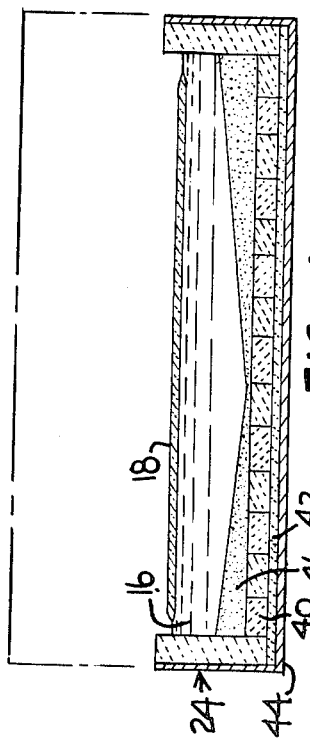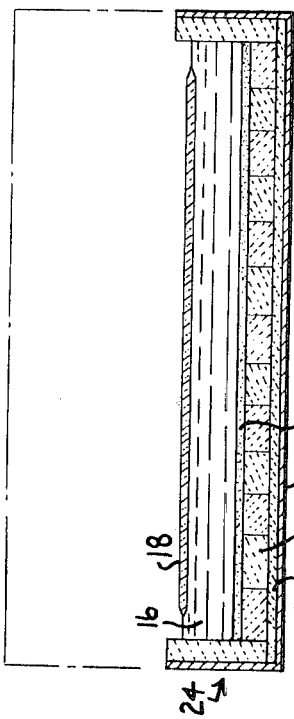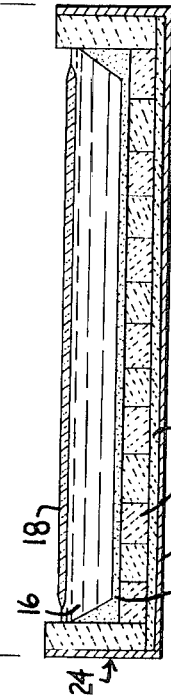
PATENTED JUN 15 1971 3,584,475
FIG. 1
FIG. 2
FIG. 3
FIG. 4
FIG. 5
INVENTORS
WILLIAM F. GALEY
JOHN E. SENSI
BY
ATTORNEYS

FLOAT GLASS TANK WITH A PARTICULATE BOTTOM COVERING

This application is a continuation-in-part of our copending applications, Ser. No. 680,155, filed Nov. 2, 1967, which is a continuation-in-part of our application Ser. No. 630,914 filed Apr. 14, 1967, and Ser. No. 787,488, filed Dec. 27, 1968, which is a division of Ser. No. 680,153, filed Nov. 2, 1967, which latter application is also a continuation-in-part of our application Ser. No. 630,914, filed Apr. 14, 1967, all applications now abandoned and being entitled, "MANUFACTURE OF GLASS."

BACKGROUND OF THE INVENTION

This invention relates to the manufacture of float glass, as when a mass of molten glass is supported on a liquid bath having a density greater than that of the glass.

In such manufacture, the liquid of the bath, generally tin or a tin alloy, is contained in a clay refractory tank constructed of refractory blocks supported on a bed of sand within a steel shell. The depth of the liquid of the bath is generally in the vicinity of 2 inches or less. The temperature of the bath is controlled, so as to be at or near the temperature of molten glass at the glass entry end of the float tank and to decrease in temperature downstream of the tank, ultimately to such a degree as to permit the glass to solidify and be taken from the bath without harm to its finished surfaces. In a tank 150 feet in length, the bath surface temperature varies from about 1950° F. at the point of entry to about 1600° F. in the first 50 feet, ultimately reaching a temperature in the vicinity of 1050° F. at the exit end of the bath.

Glass as a molten mass is fed at a controlled rate onto the surface of the bath, spreading and forming a ribbon. At starup, the glass ribbon must be guided at the feeding area in order to prevent contact with the sidewalls of the bath tank. Hooks are used for guiding the glass. At times glass is depressed unintentionally so that bottom contact is made.

At other times, as when an upset occurs, the molten glass piles up in the feed or wetback area, the layer of glass becoming too thick and failing to spread properly. In such circumstances, the glass may displace so much bath liquid as to contact the bottom of the tank.

The bottom of the float tank is ordinarily made of refractory material, as for example, silica-alumina refractory blocks which will wet with the glass at the temperatures encountered. If bottom contact occurs, glass sticks to such a bath tank bottom. When normal conduit conditions are reestablished, glass remains on the refractory blocks even though the density of the glass is less than that of the liquid of the bath. As the operation continues, "gobs" of a glassy material containing tin and alumina and having an attached tail become detached from the tank floor and rise to the surface of the bath, becoming embedded in the glass ribbon. This causes a defect in the glass which is called "cold metal drag." Release of these "-gobs" of glassy material occurs when the buoyant forces overcome the existing surface tension forces. "Cold metal drag" manifests itself as a blob of material in the glass, generally thicker than the glass and with a tail attached thereto, also in the glass. "Cold metal drag" may also be attributable to migration of alkali from the glass through the shallow tin bath with consequent formation of a glassy phase which forms on the surface of the refractory and periodically becomes detached.

THE PRIOR ART

At the temperature within the float bath container molten tin is extremely susceptible to oxidation. When oxygen reacts with the tin bath it forms dross which impairs the surface of the glass in contact with the bath and which forms deposits on parts of the container and the removal rolls. Oxide of tin may condense on the superstructure. When it falls from overhead, it impairs the top surface of the glass ribbon and when it is deposited in any appreciable amount on the rolls it produces a markoff which further impairs the under surface of the ribbon.

In these circumstances, it can be well appreciated that oxygen introduced from any source is very detrimental to the operation.

At operating temperatures, carbon has a greater affinity for oxygen than does tin. In consequence, manufacturers have sought to diminish the hazards of contamination from oxidation by the expedient of using carbon liners as a facing for the conventional refractory block with which the vessel containing the bath is constructed. Early in the development of the float glass process, narrow liners were used in the sidewalls as facing, such liners constituting narrow bands or bars of solid graphite block of such dimensions as to extend slightly above and slightly below the surface of the tin. More recently, manufacturers have faced the entire bottom block and sidewall construction with graphite blocks to a point above the glass level. Such a construction affords two advantages over a container lined with ceramic refractory only. If the glass, during forming, comes in contact with the bottom or the sidewalls, it will "kiss-off" without adhering thereto. Although quantitative results are lacking, there is no question but that such carbon liners reduce the formation of dross in comparison to the unlined refractory basin. However, such carbon block liners add greatly to the expense of the installation and they have a tendency to gas badly, particularly during startup. A further shortcoming is that they are thermally directive; that is to say in the manufacture of such shapes an orientation is imparted to the particles which results in thermal conductivity being higher in one direction than another. Finally when carbon in block form is superimposed on ceramic block, tin can still find its way through the interstices between the carbon blocks, make contact with the ceramic block and thus form an avenue for migration of alkali from the glass ribbon to the ceramic block with potential formation of the glass phase mentioned above.

SUMMARY OF THE INVENTION

In accordance with this invention, a film or layer of particulate, granular or powdered graphite is placed on at least the bottom of a float bath tank over the refractory blocks, so as to cover the blocks. Preferably about 98 percent of the graphite will pass through a 200-mesh screen. However, graphite material can be used having other particle sizes, as for example, portions passing through mesh sizes ranging from 2½ to 1000 mesh or even finer. In those cases where there are large particle sizes, the key to successful application is in the distribution of the larger particles among the smaller as will be hereinafter explained. The critical properties of the graphite substance are that the material is chemically inert with respect to the liquid of the bath and has a relatively large interfacial tension with respect to the liquid of the bath. In other words, the material will not be readily wet by the bath liquid. The material should preferably be applied so as to retain its particulate form and not cake to form a solid mass capable of cracking during use. The graphite should be reasonably free of ash, as for example, it should contain less than 1 percent ash and have a low calcium content, so as to eliminate sources of gas which could cause a bubble condition in the bottom surface of the glass. The depth of the layer is preferably on the order of one-fourth inch; however, a thinner film may be used depending on the material and size, or a layer up to one or several inches in thickness may be used if desired. The covering should be substantially continuous for at least that portion of the tank in which the glass is in flowable condition, as for example, the areas in which the temperature of the glass is on the order of 1600° F. and above. However, it can be substantially continuous for the entire bottom of the tank if desired.

The sidewalls of the tank can, if desired, be covered with a layer of the graphitic material, at least to the level of the liquid of the bath. This can be accomplished by pouring it against the walls and permitting it to assume its natural angle of repose before filling the tank with liquid bath material.

The protective layer on the bottom and/or the sidewalls may be merely a thin film of such thickness as that resulting when powdered graphite is brushed on.

After the particulate graphitic material is placed, poured or applied into position, the tank is filled with the liquid of the bath. In the case of tin, bars of tin may be placed on the layer, heated and melted, or the tank and layer may be preheated and the tin introduced in molten condition. The atmosphere in the headspace above the layer should be nonoxidizing to prevent oxidation and thus burning of the graphite.

The granular, particulate or powdered graphitic material is less dense than the liquid of the bath and yet, surprisingly, substantially all of it remains at the location in which it is placed and in substantially the same shape. This occurs because the force on any particle resulting from the combination of interfacial tensions and buoyant forces is in a downward direction. When coarse particles are present, then the finer particles must be arranged around the coarser so that the liquid does not flow beneath any of the particles. In other words, for the buoyant force of the liquid to become active, the liquid must act from beneath the particles.

The layer of particulate graphitic material may be substantially uniform in thickness of may vary in thickness. If gassing from the tank is suspected, which would cause bottom bubbles in the glass ribbon, the layer of graphite can be tapered from the center of the tank to the edges, being thicker at the edges. Such configuration will guide bubbles to the surface of the bath outside the ribbon width. Other configurations can be used which will influence thermal conditions in the bath as by changing normal convection flows therein. The layer of graphite may be contoured along a path in said container, so as to control or determine the depth of the tin in any zone of the tank and thus the depth and thermal properties of the bath can be varied, it being understood that a body of finely divided graphite is thermally nondirectional in character. This layer may be substantially wedge-shaped, as for example, from side-to-side of the tank, so as to provide a varying tin depth from side-to-side, or other configuration from side-to-side, or longitudinally along the length of the bath.

In operation, graphite does not adhere to glass, so that it protects the ribbon from adhering to the bottom or walls in two ways; it cushions the glass when contacted by the rolling action of the individual discrete particles, thus reducing friction and if contacted lightly, it acts like a nonwetting solid. Like solid graphite block, the glass will "kiss-off" if contacted lightly.

If contact is made with sufficient force or if the powdered graphite is otherwise dislodged from the bottom it will rise to the bath surface but in no manner detrimental to the process. Indeed some floating graphite at the margins of the ribbon may be beneficial.

In application, care should be taken to see that the interstices between ceramic blocks are filled with graphite or their surfaces coated therewith.

Alternatively, the powdered carbon or graphite can be replaced with other particulate, refractory materials, as for example, one selected from the group including silicon carbide, silica, alumina, boron nitride, titanium nitride, titania, zirconia, and zirconium silicate. In addition, clay refractories in particulate form can be used, so long as they are not heated to the point of fusion where the particles bond inseparately. The temperature at which the particles bond inseparately is generally on the order of 3000° F. and above, which is higher than the temperature in a float bath, i.e., 1950° F. and below.

With some of the particulate materials, for example, silicon carbide and silica, there may be some adherence of particles at temperatures normally experienced in the "hot" end of a float bath, say 1900° F. but this does not amount to fusion and does not interfere with the effectiveness of the invention because the agglomerate is easily disrupted when it comes in contact with hot glass. In other words, the particulate material serves effectively to isolate the glass from the refractory bottom even though a nominal number of the particles may stick to the glass and peel off the cover of the upper extremity of the more abundant layer lying on the bottom. The feature is that the glass does not stick or adhere to the refractory. "Cold metal drag" does not take place.

Mixtures of the various particulate materials, with or without carbon or graphite can be used within the scope of the invention. In all cases, the particulate material should possess substantially the same critical characteristics as powdered graphite or carbon, i.e., it must not react with the liquid of the bath; it must have a similar range of particle sizes, and it must have a relatively large interfacial tension with reference to the liquid of the bath.

BRIEF DESCRIPTION OF THE DRAWING

FIG. 1 is a sectional view of a typical float glass bath showing a covering or layer of graphite on the bottom thereof, for at least that portion where the glass is flowable;

FIG. 2 is a plan view of the inlet end of the apparatus with parts broken away to show constructional features;

FIG. 3 is a sectional view taken on line 3–3 of FIG. 1;

FIG. 4 is a view similar to FIG. 3 but showing another embodiment of the invention wherein the graphite material slopes from the center line of the bath tank to the outer walls; and FIG. 5 is a view similar to FIG. 3 but showing graphitic material piled at the side wall as well as on the bottom of the tank.

DESCRIPTION OF THE PREFERRED EMBODIMENT

Referring to the drawings, a forehearth of a glass melting tank is indicated at 10 which contains molten glass 12 discharged over a spout 14 onto the surface of a liquid bath 16 of greater density than the glass to eventually form a continuous ribbon of glass 18. The flow of glass over the spout 14 is controlled by regulating wheels 20 and 22, and the glass, at the exit end of the bath tank 24, is removed from the liquid bath by takeout rolls 26 and conveyed by rolls 28 into and through an annealing lehr 30.

The temperature of the liquid bath is controlled, so that as the ribbon of glass 18 moves therealong, its temperature is reduced from its entrance temperature wherein the glass is molten and at a temperature of about 1900° F. to a temperature of approximately 1050° F. At the lower temperature, the glass can be removed unharmed from the bath by mechanical means in the form of the rolls 26, 28. Conveyor rolls 28 furnish the tractive force for moving the ribbon 18 along the liquid bath 16.

Molten glass deposited on the liquid bath spreads laterally and moves rearwardly as a wetback 32 and also forwardly as the ribbon. The glass, in the absence of extraneous forces, will seek its normal equilibrium thickness, which, in the case of a soda-lime-silica glass on tin is about one-fourth inch.

In order to prevent the oxidization of the liquid of the bath, which is generally tin or a tin alloy, a reducing gas is introduced, as by headers 34 connected to a suitable source of gas and inlets 36 into the headspace about the bath. The reducing gas is generally nitrogen or a mixture of nitrogen with a small percentage of hydrogen. The exit end of the tank 24 is provided with one or more curtains 38 which may drag on the glass 18 to prevent the ingress of air into the headspace over the bath 16.

The bottom of the bath tank 24 is constructed of a plurality of refractory blocks 40, generally of a silica-alumina refractory, fitted with joints of about one-sixteenth inch to allow for expansion upon being heated. The blocks are laid on a leveling bed of a granular material 42, such as compacted sand, and within a steel shell 44.

Before the liquid of the bath is introduced into the bath tank and before the tank is heated, a layer 46 of particulate or granular or powdered graphitic material is placed over the refractory blocks 40 and is applied so as to fill the interstices in the bottom.

When tin is used as the liquid of the bath, as is the usual case, it can be introduced in solid state or in a liquid state, say, at a temperature of 1000° F. Thus, it is necessary to preheat the bath tank to either melt the tin or to retain the tin in its molten condition. However, it is known that graphite, especially in powdered form, will burn in the presence of heat and oxygen. Thus, it is necessary to supply the inert or reducing gas to the headspace during the preliminary heating of the bath tank to prevent substantial burning of the graphite powder. When in use, the graphite powder is covered with molten tin.

The layer 46 which, as previously stated, may be a film, serves to prevent sticking of glass to the bottom of the tank. When the process is started, the glass must be guided downstream as a ribbon. This is accomplished by operating personnel using hooks which dip into the molten glass and at times, the glass is depressed so as to contact the bottom. In the absence of the protective graphite layer 46, the glass would come into direct contact with the refractory blocks 40 and stick thereto. The invention prevents this undesirable effect. During upsets, as when a break in the ribbon occurs in the bath tank, the molten glass at the spout area builds up in depth and displaces the liquid of the bath so as to contact the bottom. Again, in the absence of the graphite layer 46 of the invention, the glass would stick to the bottom and cause "cold metal drag" as previously explained. This defect is overcome by the invention.

The layer of graphitic material has been effectively utilized in a thickness of one-fourth inch and more; however, the primary consideration is that there be a protective covering at least in that area of the tank in which the glass is sufficiently hot to otherwise stick to the bottom refractory blocks.

In FIG. 4 the layer of graphitic material 46 is sloped, so as to be diminished in thickness from the sidewalls of the bath tank to the center. This sloped layer provides guides for bubbles of gases if present, so they may be displaced to the sides and removed from the ribbon of glass.

In FIG. 5 there is shown a layer of graphitic material 46A which includes portions covering the bath tank sidewalls. This material is poured on the bottom and also along the sides so as to assume its natural angle of repose, say 30° to 45°. Because the material is present, glass will not stick to the sidewalls during any period of upset when the glass spreads to the walls or snakes, i.e., moves, to the walls.

As a typical graphite powder, Grade No. 38 manufactured and sold by National Carbon Company can be used. A typical analysis of this grade is as follows:

Ash    maximum 0.2 percent

Minimum fineness    98.5 percent through 200 mesh

Moisture content    maximum 0.5 percent

Sulfur content    maximum 0.015 percent

A spectroscopic analysis of this grade of graphite is as follows:

|    | Percent |
|----|---------|
| Al | 0.002 |
| Ca | 0.04 |
| Fe | 0.02 |
| Mg | 0.002 |
| Si | 0.04 |
| Ti | 0.01 |
| V  | 0.005 |
| Total impurities | 0.119 |

A typical screen analysis of this grade of graphite is as follows:

| Mesh | 10 | 20 | 35 | 65 | 100 | 150 | 200 | PAN |
|------|----|----|----|----|-----|-----|-----|-----|
| Percent (remaining) | 0 | 0 | 0 | 0 | 0 | 0 | 1 | 99 |

The individual particle sizes of this graphite have been determined as follows:

99.9 percent less than 74 microns    (200 mesh)

99 percent less than 44 microns    (325 mesh)

97 percent less than 40 microns 81 percent less than 30 microns 58 percent less than 20 microns 49 percent less than 15 microns 30 percent less than 10 microns    (1250 mesh)

10 percent less than 5 microns

It is to be understood that other grades of graphite powder can be used with various ranges of particle sizes as before explained, and the example above is merely typical of a commercially available grade suitable for use as described.

While the preferred embodiment has described the particulate material as being carbon or graphite, it is to be understood that other materials can be used as described above.

In laboratory experiments, powdered silicon carbide and powdered silica were placed in the bottoms of ceramic beakers to a depth of one-fourth inch. The prepared beakers were placed in an $N_2$-$H_2$ atmosphere furnace and heated to 1600° F. Two inches of tin were placed in each beaker over the powdered material therein. A disc of glass was placed on the surface of the molten tin in each beaker. During a two-week period, the furnace was maintained at a temperature of 1600° F. under reducing conditions. Intermittently each glass disc was driven manually downward until it was in contact with the agglomerate in the bottom of the beakers and released. The tendency for the glass to stick to the bottom was observed.

It was observed in each of these experiments that (1) the powdered material remained on the bottom of each beaker even though the density of the powder was less than that of the tin thereover, and (2) glass does not stick to the bottom, but peeled off a thin cover of powdered material from the agglomerate in the beaker on rising to the surface of the tin bath.

Similar experiments were performed with powdered graphite; the graphite remained on the bottom of the beakers; glass did not stick to the powdered graphite.

We claim:

1. In a process of forming glass in which molten glass is supported upon a liquid bath of molten metal consisting essentially of tin in a container, said liquid having a density greater than glass, the improvement which comprises,
   1. depositing a layer of particles unreactive with said molten metal, said particles being selected from the group consisting of graphite, silicon carbide, silica, alumina, boron nitride, titanium nitride, titania, zirconia, zirconium silicate and mixtures thereof, upon the surface of the bottom of said container at least in a region where the glass is molten when the process is in operation, said particles having a large interfacial tension with respect to the liquid of the bath, being more buoyant than the liquid of said bath and of sizes such that said particles pass a screen having a mesh ranging from 2½ to about 1000 mesh,
   2. depositing said bath liquid upon said layer of particles so as to form a liquid bath overlying said layer, and leave substantially all of said particles remaining where deposited, and
   3. thereafter introducing molten glass onto the surface of said liquid bath.

2. A process according to claim 1 wherein said layer of particles is about one-quarter inch in thickness.

3. A process according to claim 1 wherein the depth of said layer of particles is varied in thickness from wall to wall in a predetermined pattern.

4. A process according to claim 1 wherein said vessel has sidewalls to which molten glass will adhere when contacted therewith and the sidewalls are at least partially coated with a protective layer of said particles.

5. A process according to claim 1 wherein said particles are graphite.

6. An apparatus for producing float glass comprising,
a refractory container for a liquid bath of molten metal consisting essentially of tin on which glass in a formable state is supported, formed and cooled, said container having a bottom of a refractory which will wet glass and to which molten glass will adhere when in contact therewith,
a layer of particles unreactive with said molten metal, said particles being selected from the group consisting of graphite, silicon carbide, silica, alumina, boron nitride, titanium nitride, titania, zirconia, zirconium silicate and mixtures thereof, on the surface of a bottom section of said container, said particles substantially covering the entire bottom surface of said container and having a large interfacial tension with respect to the liquid of the bath and being more buoyant than the liquid of the liquid bath employed in said container and being of sizes such that said particles pass a screen having a mesh ranging from 2½ to about 1000 mesh, and
a liquid bath consisting essentially of tin in said container overlying said layer of particles.

7. An apparatus as recited in claim 6 having sidewalls to which molten glass will adhere when contacted therewith further including a protective coating of said particles on at least a portion of said sidewalls.

8. An apparatus as recited in claim 6 wherein said particles are graphite.